(12) United States Patent
Hayakawa et al.

(10) Patent No.: US 11,378,737 B2
(45) Date of Patent: Jul. 5, 2022

(54) OPTICAL FIBER PREFORM, METHOD FOR MANUFACTURING OPTICAL FIBER PREFORM, AND METHOD FOR SETTING STRIAE PITCH OF OPTICAL FIBER PREFORM

(71) Applicant: SUMITOMO ELECTRIC INDUSTRIES, LTD., Osaka (JP)

(72) Inventors: Masatoshi Hayakawa, Osaka (JP); Manabu Shiozaki, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 143 days.

(21) Appl. No.: 16/652,779

(22) PCT Filed: Oct. 3, 2018

(86) PCT No.: PCT/JP2018/037067
§ 371 (c)(1),
(2) Date: Apr. 1, 2020

(87) PCT Pub. No.: WO2019/069989
PCT Pub. Date: Apr. 11, 2019

(65) Prior Publication Data
US 2020/0247709 A1    Aug. 6, 2020

(30) Foreign Application Priority Data

Oct. 6, 2017  (JP) .............................. JP2017-196036

(51) Int. Cl.
*G02B 6/036*    (2006.01)

(52) U.S. Cl.
CPC ........... *G02B 6/036* (2013.01); *G02B 6/0365* (2013.01); *G02B 6/03694* (2013.01)

(58) Field of Classification Search
CPC ... G02B 6/036; G02B 6/0365; G02B 6/03694
See application file for complete search history.

(56) References Cited

U.S. PATENT DOCUMENTS

| | | | | |
|---|---|---|---|---|
| 4,231,774 A | * | 11/1980 | Maklad | ................. C03B 37/018 65/413 |
| 7,462,574 B2 | * | 12/2008 | Iwahashi | ............. C03B 19/1484 501/53 |
| 9,989,458 B2 | * | 6/2018 | Cook | .................... G01N 21/412 |

(Continued)

FOREIGN PATENT DOCUMENTS

| | | |
|---|---|---|
| CN | 107110778 A | 8/2017 |
| JP | 2006-096608 A | 4/2006 |
| JP | 2012-062240 A | 3/2012 |

(Continued)

*Primary Examiner* — Ryan A Lepisto
(74) *Attorney, Agent, or Firm* — Faegre Drinker Biddle & Reath LLP

(57) ABSTRACT

An optical fiber preform including a glass material and a refractive index adjusting additive is disclosed. This preform has striae due to difference in concentration of the additive and the striae have concentric refractive index periodicity in at least a part thereof from a radial center of the preform to an outer periphery thereof. The respective striae pitches each indicating a period of the refractive index periodicity increase from the center of the preform to the outer periphery thereof.

10 Claims, 9 Drawing Sheets

(56) References Cited

U.S. PATENT DOCUMENTS

2012/0321891 A1* 12/2012 Nunome ........... C03B 37/01453
                                                              65/421

FOREIGN PATENT DOCUMENTS

| | | |
|---|---|---|
| JP | 2013-047165 A | 3/2013 |
| JP | 2013-096899 A | 5/2013 |
| WO | WO-2011/108639 A1 | 9/2011 |
| WO | WO-2016/069832 A1 | 5/2016 |

* cited by examiner

OPTICAL FIBER PREFORM, METHOD FOR MANUFACTURING OPTICAL FIBER PREFORM, AND METHOD FOR SETTING STRIAE PITCH OF OPTICAL FIBER PREFORM

TECHNICAL FIELD

The present disclosure relates to an optical fiber preform, a method for manufacturing an optical fiber preform, and a method for setting striae pitches of an optical fiber preform. The present application claims priority based on Japanese Patent Application No. 2017-196036, filed on Oct. 6, 2017, the entire contents disclosed in the application are incorporated herein by reference.

BACKGROUND ART

Patent Literature 1 discloses a method for manufacturing a glass fine particle deposit. In this manufacturing method, glass fine particle layers are laminated such that the thickness of the glass fine particle layer deposited for each traverse differs in each of adjacent layers.

CITATION LIST

Patent Literature

Patent Literature 1: Japanese Unexamined Patent Publication No. JP2013-047165
Patent Literature 2: Japanese Unexamined Patent Publication No. JP2013-096899

SUMMARY OF INVENTION

The present disclosure provides an optical fiber preform including a glass material and a refractive index adjusting additive. The preform has striae due to difference in concentration of the additive, the striae have concentric refractive index periodicity in at least a part thereof from a radial center of the preform to an outer periphery thereof. Respective striae pitches each indicating a period of the refractive index periodicity increase from the center of the preform to the outer periphery thereof.

The present disclosure provides a method for manufacturing an optical fiber preform. This manufacturing method includes sequentially laminating glass layers on a deposition target in a radial direction by repeatedly and reciprocally moving, with respect to the deposition target, a heating source configured to combine glass particles in an axial direction of the deposition target while rotating the deposition target, and sequentially laminating the combined glass particles while adding a refractive index adjusting additive to a glass raw material. In the laminating, the respective glass layers are deposited so that thicknesses of the glass layers increase from a radial center of the preform to an outer periphery thereof.

The present disclosure provides a method for setting striae pitches of an optical fiber preform. This setting method is a method for setting striae pitches indicating a period of refractive index periodicity of an optical fiber preform having striae due to difference in concentration of a refractive index adjusting additive added to the optical fiber preform. This setting method includes calculating a relationship between a radius from a center of the preform to an outer periphery thereof and a deviation amount of a refractive index distribution, in each of a plurality of striae pitches indicating the period of the refractive index periodicity, and combining an optimal striae pitch variation pattern by referring to the relationship between the radius of each striae pitch and the deviation amount of the refractive index distribution calculated in the calculating. In the combining, the striae pitches are combined so as to increase from the center of the preform to the outer periphery thereof.

DESCRIPTION OF EMBODIMENTS

Figure 1:
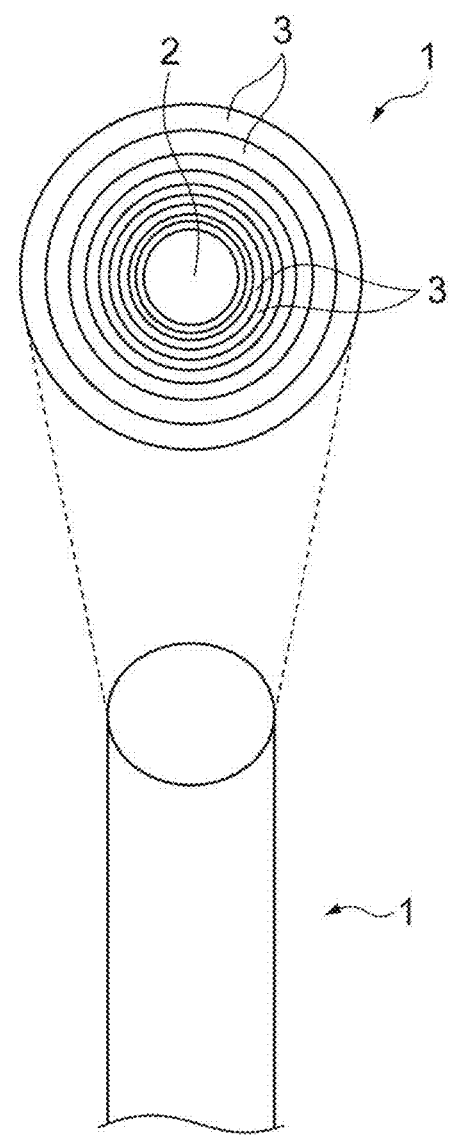
FIG. 1 is a schematic view including a partially cross-sectional view of a glass preform for an optical fiber with striae according to an embodiment.

Problems to be Solved by the Present Disclosure

When manufacturing a glass fine particle deposit for an optical fiber preform by an OVD method or the like, a traverse speed and a rotation speed are generally constant. In this case, the thickness of each glass layer constituting the glass fine particle deposit is also substantially constant. Accordingly, stripe-shaped streaks (striae) corresponding to the traverse cycle or the rotation cycle of the starting material may be generated on the preform made of the glass fine particle deposit. When a measuring laser beam is incident from a side surface of a glass material in order to measure the refractive index distribution of the preform having such striae, a periodic change in refractive index due to the striae occurs in the glass material. As a result, the laser beam is diffracted and a part of the refractive index distribution is disturbed. As a result, the refractive index distribution of the preform having the striae cannot be accurately measured. Thus, it is preferable to highly accurately measure the refractive index distribution of the optical fiber preform having the striae.

Effect of the Present Disclosure

According to the present disclosure, it is possible to highly accurately measure the refractive index distribution of the optical fiber preform with the striae.

Description of Embodiment of the Present Invention

The contents of the embodiments of the present disclosure will be individually listed and described. An optical fiber preform according to the embodiment includes a glass material and a refractive index adjusting additive. The preform includes striae due to the difference in concentration of the additive and the striae have concentric refractive index periodicity in at least a part thereof from the radial center of the preform to the outer periphery of thereof. Respective striae pitches each indicating a period of the refractive index periodicity increase from the center of the preform to the outer periphery thereof.

In the optical fiber preform, the striae pitches each indicating the period of the refractive index periodicity increase from the center of the preform to the outer periphery thereof. According to the examination of simulation or the like by the present inventors, as shown in FIGS. 4A to 4C, FIGS. 5A to 5C, and FIGS. 6A to 6C, it is found that the gravity center position of the measuring laser beam corresponding to the deviation amount (distortion) of the refractive index distribution changes significantly or somewhat significantly from zero to a plus direction or a minus direction depending on the position in the radius (normalized radius) direction. According to the further examination of the present inventors, when the striae pitches each indicating the period of the refractive index periodicity is set to increase from the center of the preform to the outer periphery thereof, for example, as shown in FIG. 7, it is found that the position of the gravity center position of the measuring laser beam corresponding to the deviation amount of the refractive index distribution can be kept close to zero (for example, in the range of 0 to ±20 μm) at any position in the radial direction. Thus, when the striae pitches of the preform increase from the center of the preform to the outer periphery thereof, the measurement result of the refractive index distribution of the preform by the striae pitches can be prevented from being distorted. Accordingly, it is possible to more accurately measure the refractive index distribution of the optical fiber preform having the striae.

In the optical fiber preform, the striae pitches each indicating the period of the refractive index periodicity may increase from the center of the preform to the outer periphery thereof in the range of 2 μm or more and 10 μm or less. According to this configuration, it is possible to more accurately and reliably measure the refractive index distribution of the optical fiber preform having the striae.

In the optical fiber preform, the striae pitches may have at least three different thicknesses. For example, the striae pitches may have three different thicknesses of 5.5 μm, 6.0 μm, and 6.5 μm and the striae pitches may have three different thicknesses of 5 μm, 6 μm, and 7 μm. Further, the striae pitches may have at least five different thicknesses and may further have at least seven different thicknesses. For example, the striae pitches may have nine different thicknesses of 4.0 μm, 4.5 μm, 5.0 μm, 5.5 μm, 6.0 μm, 6.5 μm, 7.0 μm, 7.5 μm, and 8.0 μm. Furthermore, the striae pitches may increase from the center of the preform to the outer periphery thereof by the unit of 0.3 μm or more and may increase from the center of the preform to the outer periphery thereof by the unit of, for example, 0.5 μm.

In the optical fiber preform, each of the striae pitches may be set to increase from the center of the preform to the outer periphery thereof so that a curve approximating a relationship between a radius facing from the center of the preform to the outer periphery thereof and each striae pitch increasing from the center of the preform to the outer periphery thereof protrudes upward. According to this configuration, it is possible to more accurately and reliably measure the refractive index distribution of the optical fiber preform having the striae.

A method for manufacturing an optical fiber preform according to the embodiment includes sequentially laminating glass layers on a deposition target in a radial direction by repeatedly and reciprocally moving, with respect to the deposition target, a heating source configured to combine glass particles in an axial direction of the deposition target while rotating the deposition target, and sequentially laminating the combined glass particles while adding a refractive index adjusting additive to a glass raw material. In the laminating, the respective glass layers are deposited so that thicknesses of the respective glass layers increase from a radial center of the preform to an outer periphery thereof.

In the method for manufacturing the optical fiber preform, the thicknesses of the glass layers corresponding to the striae pitches indicating the period of the refractive index periodicity increase from the center of the preform to the outer periphery thereof. In this case, as described above, since it is possible to prevent the distortion of the measurement result of the refractive index distribution of the preform by the striae pitch, it is possible to manufacture the optical fiber preform having the striae capable of highly accurately measuring the refractive index distribution.

In the method for manufacturing the optical fiber preform, the respective glass layers may be sequentially laminated so that the thicknesses of the glass layers increase from the radial center of the optical fiber preform to the outer periphery thereof by reducing a moving speed of the heating source. In this case, it is possible to easily increase the thickness of each glass layer.

In the method for manufacturing the optical fiber preform, the respective glass layers may be sequentially laminated so that the thicknesses of the glass layers increase from the radial center of the optical fiber preform to the outer periphery thereof by increasing a supply amount of the glass raw material. In this case, it is possible to easily increase the thickness of each glass layer.

A method for setting striae pitches of an optical fiber preform according to the embodiment is a method for setting striae pitches each indicating a period of refractive index periodicity of an optical fiber preform having striae due to difference in concentration of a refractive index adjusting additive added to the optical fiber preform. This setting method includes calculating a relationship between a radius from a center of the preform to an outer periphery thereof and a deviation amount of a refractive index distribution, in each of a plurality of striae pitches indicating the period of the refractive index periodicity; and combining an optimal striae pitch variation pattern by referring to the relationship between the radius of each striae pitch and the deviation amount of the refractive index distribution calculated in the calculating. In the combining, the striae pitches are combined so as to increase from the center of the preform to the outer periphery thereof.

In the method for setting the striae pitches of the optical fiber preform, the optimal striae pitch variation pattern is combined so that each striae pitch increases from the center of the preform to the outer periphery thereof. In this case, as described above, since it is possible to prevent the distortion of the measurement result of the refractive index distribution of the preform by the striae pitches, it is possible to design the configuration of the optical fiber preform having the striae capable of accurately measuring the refractive index distribution.

According to the method for setting the striae pitches of the optical fiber preform, in the combining, the optimal striae pitch variation pattern may be combined so that the respective striae pitches sequentially increase from the center of the preform to the outer periphery thereof in the range of 2 μm or more and 10 μm or less. In this case, it is possible to design the configuration of the optical fiber preform having a more appropriate configuration by measuring the refractive index distribution.

Detail of Embodiment of the Present Invention

Detailed examples of an optical fiber preform, a method for manufacturing an optical fiber preform, and a method for setting striae pitches according to the embodiment of the present disclosure will be described below with reference to the drawings. The invention is not limited to these examples, but is indicated by the claims. The invention is intended to include all modifications within the meaning and scope equivalent to the claims. In the following description, the same components will be denoted by the same reference numerals in the description of the drawings and a redundant description will be omitted.

FIG. 1 is a schematic view including a partially cross-sectional view of an optical fiber preform having striae according to the embodiment. A glass preform 1 (a core material) for an optical fiber is substantially includes a glass material and a refractive index adjusting additive. As illustrated in FIG. 1, the glass preform includes a center portion 2 and a plurality of (in the embodiment, for example, nine) glass deposition layers 3 sequentially laminated on the outer periphery of the center portion 2. Each layer of the plurality of glass deposition layers 3 has striae due to difference in the concentration of the refractive index adjusting additive and has concentric refractive index periodicity. The thickness of each layer of the plurality of glass deposition layers 3 corresponds to a striae pitch P to be described later.

Figure 2:
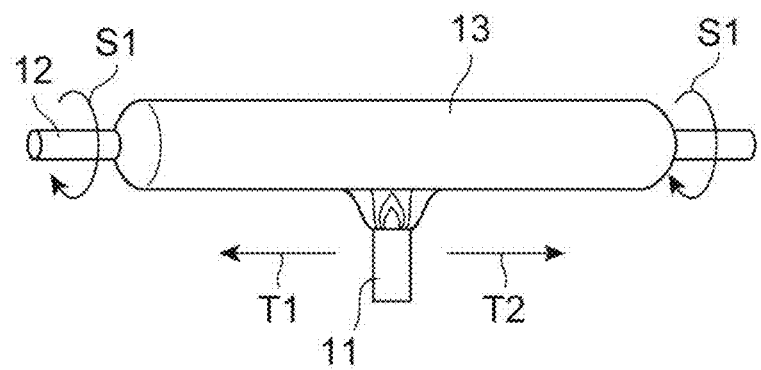
FIG. 2 is a schematic view for describing a method for manufacturing the glass preform illustrated in FIG. 1 by an outside chemical vapor deposition method (OVD method).

FIG. 2 is a schematic view for describing a method for manufacturing the glass preform illustrated in FIG. 1 by an outer chemical vapor deposition method (OVD method). When manufacturing the glass preform 1, as illustrated in FIG. 2, at least a glass raw material gas and a flame forming gas are supplied into a burner 11 (heating source) inside a reaction vessel with an exhaust device so that soot is generated in an oxyhydrogen flame ejected from the burner 11. Then, a starting material 12 is rotated around an axis in a rotation direction S1 while the burner 11 is reciprocally traversed along the growth axis directions T1 and T2 so that soot is generated on the outer peripheral surface of the starting material 12. Accordingly, a glass fine particle deposit 13 is manufactured.

The starting material used here may be called, for example, a starting rod or a target rod, and is a rod or a pipe made of ceramic such as alumina (aluminum oxide) or quartz. The glass material is, for example, high-purity $GeCl_4$ and high-purity $SiCl_4$. The flame forming gas is a gas obtained by mixing, for example, $O_2$ (oxygen) gas, $H_2$ (hydrogen) gas, and $N_2$ (nitrogen) gas. The transparent glass preform 1 for the optical fiber is manufactured by heating and sintering the glass fine particle deposit 13 manufactured according to the manufacturing method illustrated in FIG. 2 from such a material. A glass fiber can be manufactured by drawing the glass preform 1 under predetermined processing conditions. It is measured whether a predetermined refractive index distribution is formed in a core corresponding portion before the drawing.

In this measurement, the refractive index distribution to be measured may be distorted by the striae generated in the glass preform 1, and thus an accurate refractive index distribution might not be able to be measured. In order to solve this problem, the present inventors have first examined a relationship between respective gravity center positions of the measuring laser beam each corresponding to the deviation amount (distortion) of the refractive index distribution and respective positions in the radius (normalized radius) direction, at each striae pitch P of the glass preform 1, and have obtained simulation results shown in FIGS. 4A to 4C, FIGS. 5A to 5C, and FIGS. 6A to 6C. After the evaluation thereof, as shown in FIGS. 4A to 4C, FIGS. 5A to 5C, and FIGS. 6A to 6C, it is found that changes in the gravity center positions of the laser beam are largely different in response to the size (width: μm) of each striae pitch P. These simulations indicate the changes in the gravity center positions of the measuring laser beam when each striae pitch P is constant. The inventors further studied and found that respective portions where the gravity center positions of the laser beam in the diagrams each showing a variation of the gravity center position of the laser beam became zero, were dotted, as indicated by the circle in each diagram. Then, it has been conceived that the deviation amount (distortion) of the refractive index distribution can be reduced in the entire radial direction of the glass preform 1 by setting an appropriate striae pitch in which such portions (optimal portions) are connected. The normalized radius (x/R) used here is indicted by a ratio of the radial position x of the preform with respect to the core radius R of the preform. The normalized radius 0 (zero) indicates the gravity center position of the preform, and the normalized radius 1.0 indicates the position of the core radius. The gravity center position indicates the gravity center position of the measuring laser beam intensity distribution on a plane perpendicular to the incident light at a position separated by 25 mm after the measuring laser beam is incident from the side surface of the glass preform 1 and passes through a plane including the center axis of the glass preform 1 perpendicularly to the incident light. The gravity center position 0 corresponds to the gravity center position without the striae.

Figure 4A:
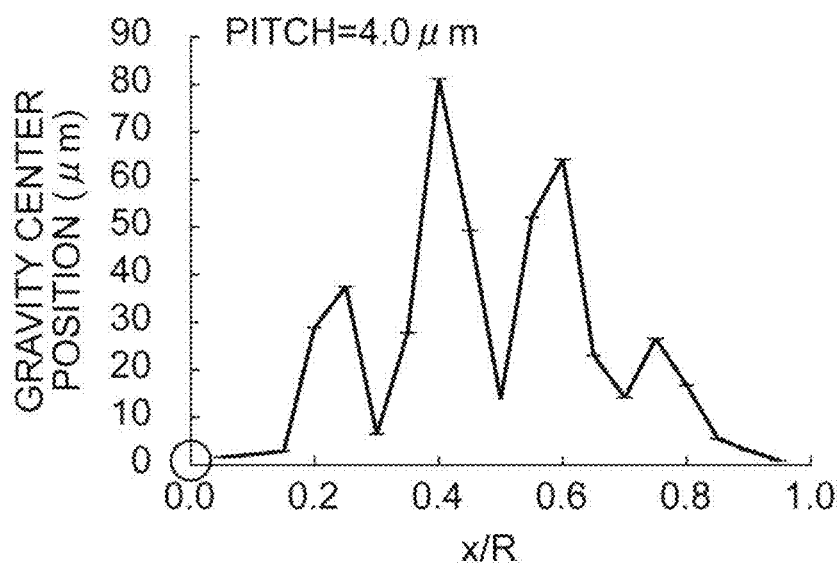
FIG. 4A is a graph showing a simulation result showing a change in the gravity center position of a laser beam when a striae pitch is changed to 4.0 µm.
Figure 4B:
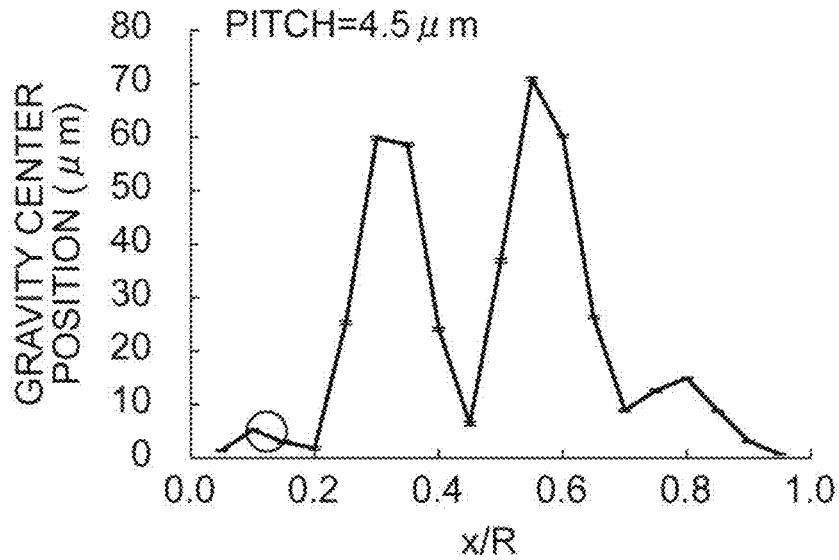
FIG. 4B is a graph showing a simulation result showing a change in the gravity center position of the laser beam when the striae pitch is changed to 4.5 µm.
Figure 4C:
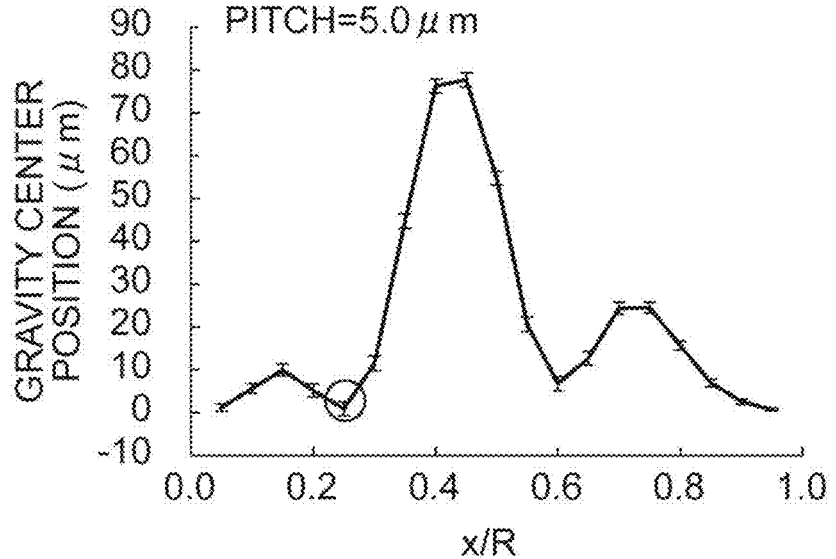
FIG. 4C is a graph showing a simulation result showing a change in the gravity center position of the laser beam when the striae pitch is changed to 5.0 µm.

In particular, as shown in FIG. 4A, when the striae pitch P is 4.0 μm, the gravity center position of the laser beam becomes about 0 μm at a position in which the normalized radius (x/R) is zero. As shown in FIG. 4B, when the striae pitch P is 4.5 μm, the gravity center position of the laser beam becomes about 0 μm at a position in which the normalized radius (x/R) is 0.1. As shown in FIG. 4C, when the striae pitch P is 5.0 μm, the gravity center position of the laser beam becomes about 0 μm at a position in which the normalized radius (x/R) is 0.2. Here, "about 0 μm" indicates, for example, a range of ±20 μm around zero (0 μm) at the gravity center position and, more specifically, a range of ±10 μm around zero (0 μm) at the gravity center position. The same applies to the following description.

Figure 5A:
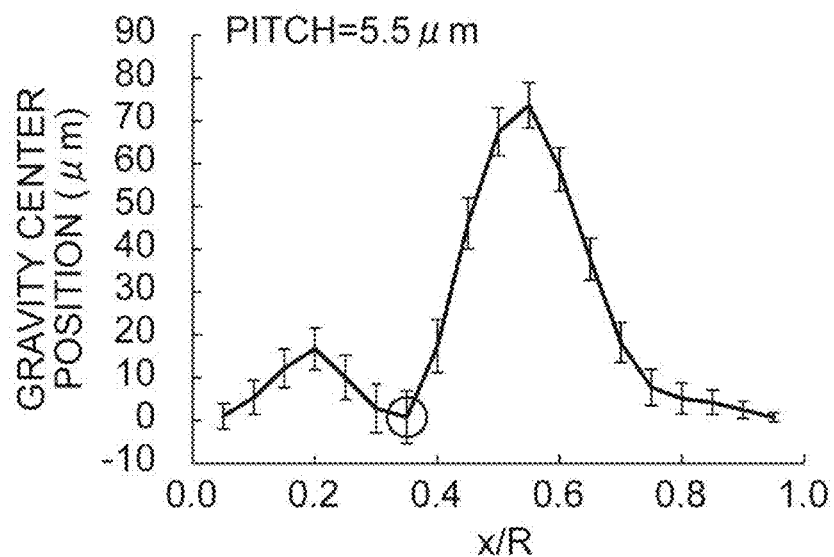
FIG. 5A is a graph showing a simulation result showing a change in the gravity center position of the laser beam when the striae pitch is changed to 5.5 µm.
Figure 5B:
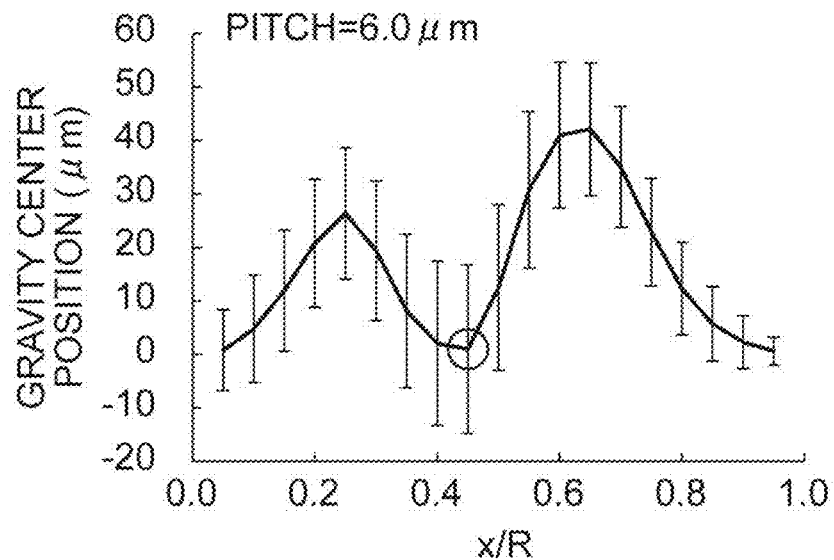
FIG. 5B is a graph showing a simulation result showing a change in the gravity center position of the laser beam when the striae pitch is changed to 6.0 µm.
Figure 5C:
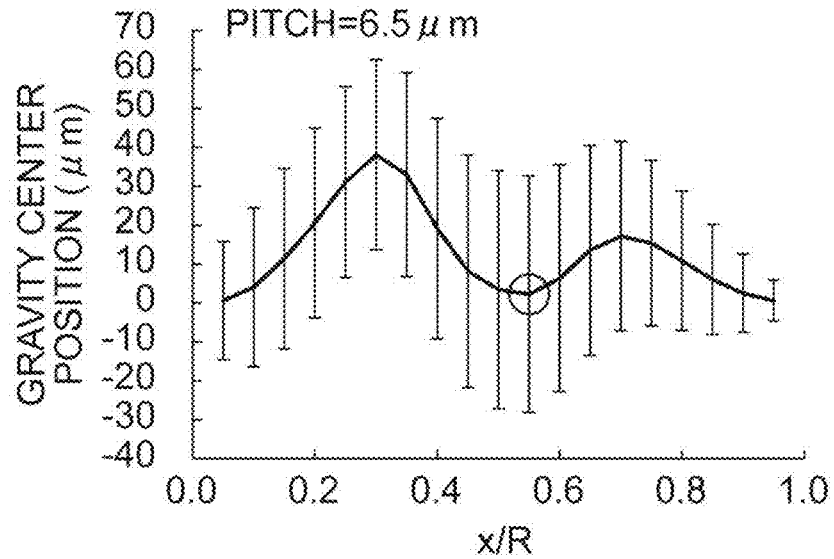
FIG. 5C is a graph showing a simulation result showing a change in the gravity center position of the laser beam when the striae pitch is changed to 6.5 µm.

Similarly, as shown in FIG. 5A, when the striae pitch P is 5.5 μm, the gravity center position of the laser beam becomes about 0 μm at a position in which the normalized radius (x/R) is a little smaller than 0.4. As shown in FIG. 5B, when the striae pitch P is 6.0 μm, the gravity center position of the laser beam becomes about 0 μm at a position in which the normalized radius (x/R) is a little smaller than 0.5. As shown in FIG. 5C, when the striae pitch P is 6.5 μm, the gravity center position of the laser beam becomes about 0 μm at a position in which the normalized radius (x/R) is a little smaller than 0.6.

Figure 6A:
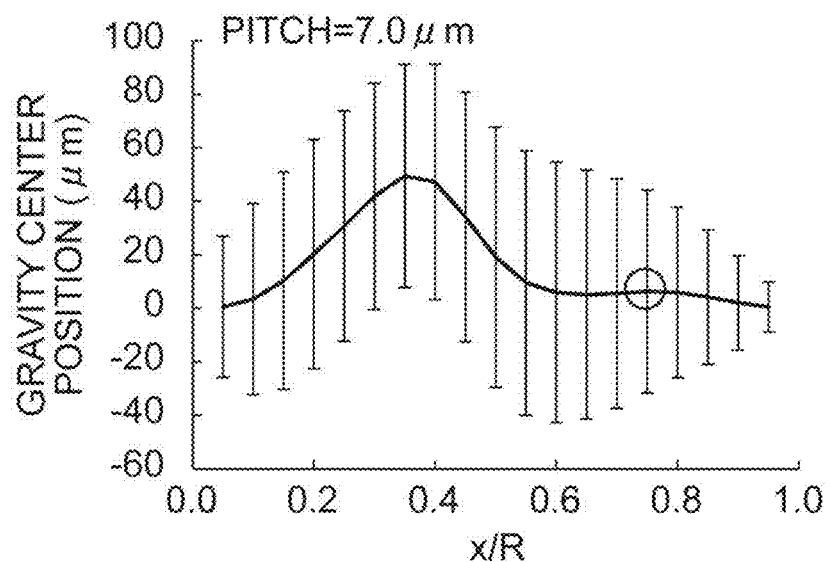
FIG. 6A is a graph showing a simulation result showing a change in the gravity center position of the laser beam when the striae pitch is changed to 7.0 µm.
Figure 6B:
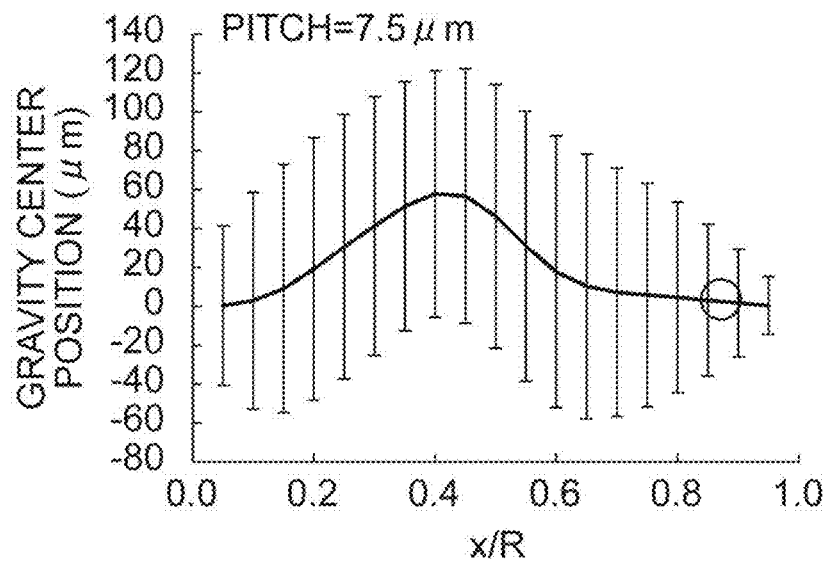
FIG. 6B is a graph showing a simulation result showing a change in the gravity center position of the laser beam when the striae pitch is changed to 7.5 µm.
Figure 6C:
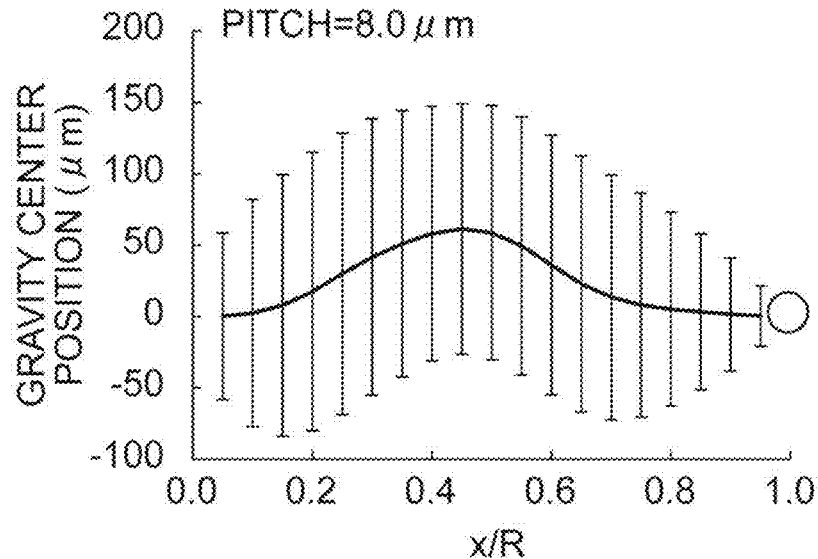
FIG. 6C is a graph showing a simulation result showing a change in the gravity center position of the laser beam when the striae pitch is changed to 8.0 µm.
Figure 7:
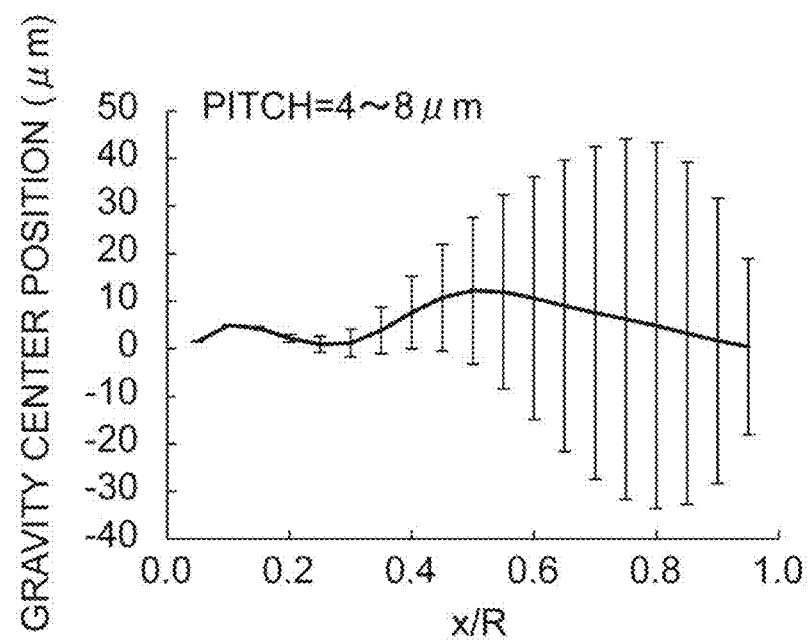
FIG. 7 is a graph obtained by combining portions in which changes in the gravity center positions of the laser beam are small in the simulation results shown in FIGS. 4A to 4C, FIGS. 5A to 5C, and FIGS. 6A to 6C.

Similarly, as shown in FIG. 6A, when the striae pitch P is 7.0 μm, the gravity center position of the laser beam becomes about 0 μm at a position in which the normalized radius (x/R) is just over 0.7. As shown in FIG. 6B, when the striae pitch P is 7.5 μm, the gravity center position of the laser beam becomes about 0 μm at a position in which the normalized radius (x/R) is just over 0.8. As shown in FIG. 6C, when the striae pitch P is 8.0 μm, the gravity center position of the laser beam becomes about 0 μm at a position in which the normalized radius (x/R) is a little smaller than 1.0.

Then, it was found that the gravity center positions of the laser beam could be substantially zero (or the vicinity thereof) in any radial direction when the portions (glass layers) of the preform were formed so that the striae pitches P increased in order of 4.0 μm, 4.5 μm, 5.0 μm, 5.5 μm, 6.0 μm, 6.5 μm, 7.0 μm, 7.5 μm, and 8.0 μm from the center of the glass preform 1 to the outer periphery thereof by combining these appropriate portions (see FIG. 7). It was found that the glass preform 1 capable of more accurately measuring the refractive index distribution hardly affected by the striae could be obtained by combining the optimal portions (portions in which the gravity center positions of the laser beam were around zero) of the striae pitches P shown in FIGS. 4A to 4C, FIGS. 5A to 5C, and FIGS. 6A to 6C as shown in FIG. 7. The optimal striae pitches of the glass preform 1 can have, for example, a pitch variation shown in FIG. 3. When the preform has striae pitch increase according to the striae pitch variation shown in FIG. 3, it is possible to reduce deviation in the refractive index distribution due to the striae, for example, when the refractive index distribution of the glass preform 1 is measured. Accordingly, it is possible to measure a more accurate refractive index distribution. The error bar extending in the vertical direction in FIGS. 4A to 4C, FIGS. 5A to 5C, FIGS. 6A to 6C, and FIG. 7 indicates the gravity center position of the measuring laser beam changing according to difference in phase of the striae at the corresponding position in the radial direction. The simulation was performed on the condition that the incident beam diameter of the measuring laser beam was 12 μm. When the pitch of the striae becomes larger than 6 μm, an error bar tends to increase. Thus, in order to obtain an average gravity center position at the position in the radial direction, it is preferable to average the gravity center position in a range of about one cycle of the striae pitch in the radial direction.

As described above, the glass preform 1 employs a configuration in which the striae pitches P each indicating the period of the refractive index periodicity increase from the center of the preform to the outer periphery thereof. As shown in the simulation results of FIGS. 4A to 4C, FIGS. 5A to 5C, FIGS. 6A to 6C, and FIG. 7, when the striae pitches of the preform increase from the center of the preform to the outer periphery thereof, it is possible to prevent the distortion of the measurement result of the refractive index distribution of the preform by the striae pitches. Accordingly, it is possible to more accurately measure the refractive index distribution of the glass preform having the striae.

In the glass preform 1, the striae pitches each indicating the period of the refractive index periodicity increase from the center of the preform to the outer periphery thereof in the range of 2 μm or more and 10 μm or less. Thus, it is possible to more accurately and reliably measure the refractive index distribution of the glass preform having the striae. The striae pitches increase in nine different thicknesses in the embodiment, but the number of the thicknesses included in the striae pitches is not limited. The striae pitches may have three or more different thicknesses, five or more different thicknesses, or seven or more different thicknesses. Each striae pitch increases by the unit of 0.5 μm from the center of the glass preform 1 to the outer periphery thereof in the embodiment, but the invention is not limited thereto. For example, each striae pitch may increase by the unit of 0.3 μm or more from the center of the glass preform 1 to the outer periphery thereof.

Figure 3:
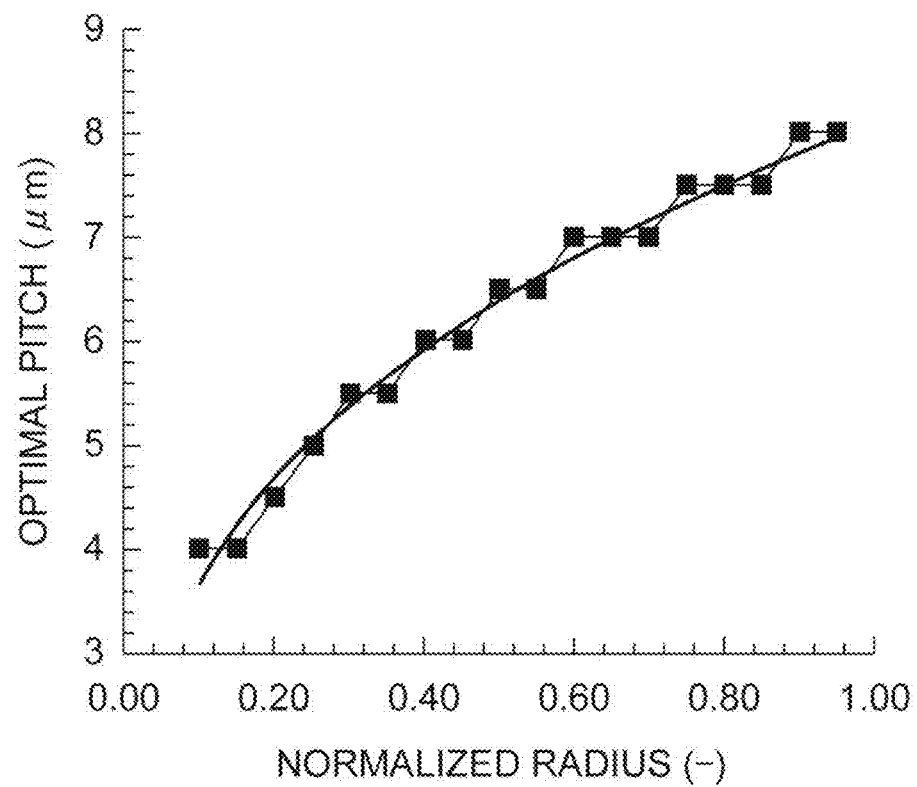
FIG. 3 is a diagram showing a curve approximating a relationship between a normalized radius and an optimal striae pitch in the glass preform shown in FIG. 1.

In the glass preform 1, each striae pitch can be set to increase from the center of the preform to the outer periphery thereof so that a curve approximating a relationship between the radius from the center of the preform to the outer periphery thereof and each striae pitch increasing from the center of the preform to the outer periphery thereof protrudes upward, for example, as shown in FIG. 3. In this case, it is possible to more accurately and reliably measure the refractive index distribution of the glass preform having the striae.

The burner 11 (heating source) for combing glass particles is repeatedly and reciprocally moved in the axial direction of the starting material 12 (the deposition target) with respect to the starting material 12 relatively while rotating the starting material 12, and the combined glass particles are sequentially laminated while adding the refractive index adjusting additive to the glass raw material. Thereby, it is possible to sequentially laminate the glass layers on the starting material 12 in the radial direction and manufacture the glass preform 1. In this manufacturing method, the glass layers are deposited so that the thicknesses of the glass layers increase from the radial center of the glass preform to the outer periphery thereof. In this manufacturing method, as described above, the thicknesses of the glass layers each corresponding to the striae pitch P indicating the period of the refractive index periodicity increase from the center of the preform to the outer periphery thereof. Thus, as described above, it is possible to prevent the distortion of the measurement result of the refractive index distribution of the preform by the striae pitches, and then it is possible to manufacture the glass preform having the striae capable of accurately measuring the refractive index distribution.

As an aspect of this manufacturing method, the glass layers may be sequentially laminated so that the thicknesses of the glass layers increase from the radial center of the glass preform to the outer periphery thereof by reducing the moving speed of the burner 11. The glass layers may be sequentially laminated so that the thicknesses of the glass layers increase from the radial center of the glass preform to the outer periphery thereof by increasing a glass raw material supply amount. In any case, it is easy to sequentially increase the thickness of each glass layer.

A striae pitch setting method according to the embodiment is a method for setting striae pitches each indicating a period of refractive index periodicity of a glass preform having striae due to difference in concentration of a refractive index adjusting additive added to the optical fiber preform. This setting method includes a calculating step of calculating a relationship between a radius from a center to an outer periphery in each of a plurality of striae pitches indicating the period of the refractive index periodicity and a deviation amount of a refractive index distribution (see FIGS. 4A to 4C, FIGS. 5A to 5C, and FIGS. 6A to 6C), and a combining step of combining an optimal striae pitch variation pattern by referring to the relationship between the radius of each striae pitch and the deviation amount of the refractive index distribution calculated in the calculating process (see FIGS. 7 and 3). In the combining process, the striae pitches are combined so as to increase from the center of the preform to the outer periphery thereof. In this case, as described above, it is possible to prevent the distortion of the measurement result of the refractive index distribution of the preform by the striae pitches, and then, it is possible to appropriately design the configuration of the glass preform having the striae capable of accurately measuring the refractive index distribution.

Figure 8:
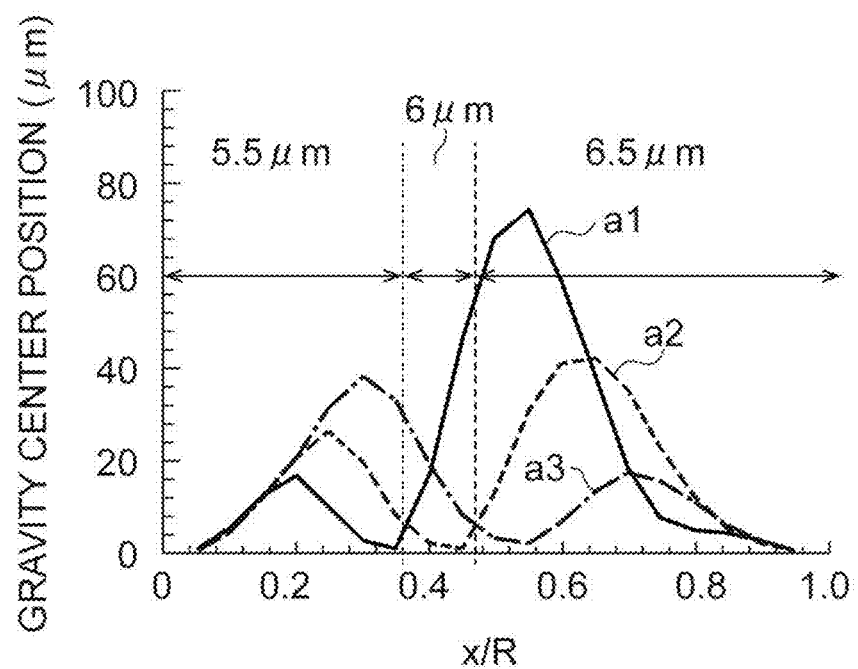
FIG. 8 is another graph obtained by combining portions in which changes in the gravity center positions of the laser beam are small.

As described above, the glass preform for the optical fiber, the glass preform manufacturing method, and the glass preform setting method according to the embodiment have been described, but the invention is not limited to these. Then, various modifications can be applied. For example, in the glass preform, an example in which the striae pitches have nine levels of 4.0 to 8.0 μm has been described. As shown in FIG. 8, a configuration in which the striae pitches P have three levels of 5.5 μm, 6.0 μm, and 6.5 μm and the striae pitches P increase from the center of the preform to the outer periphery thereof may be employed. In this case, it is possible to prevent the distortion of the measurement result of the refractive index distribution of the preform by the striae pitches to some extent. Accordingly, it is possible to accurately measure the refractive index distribution of the glass preform having the striae. In FIG. 8, a1 indicates a change in the gravity center position of the measuring laser beam when the striae pitch P is 5.5 μm, a2 indicates a change in the gravity center position of the measuring laser beam when the striae pitch P is 6.0 μm, and a3 indicates a change in the gravity center position of the measuring laser beam when the striae pitch P is 6.5 μm. By sequentially combining these a1 to a3, appropriate striae pitches can be obtained.

Figure 9:
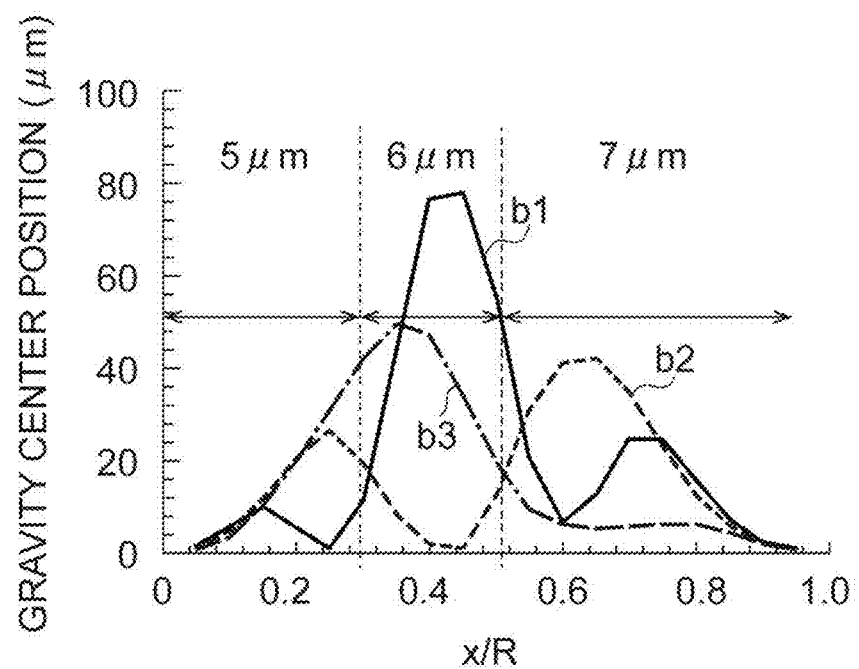
FIG. 9 is still another graph obtained by combining portions in which changed in the gravity center positions of the laser beam are small.

For example, as shown in FIG. 9, a configuration in which the striae pitches P have three levels of 5.0 μm, 6.0 μm, and 7.0 μm and the striae pitches P increase from the center of the preform to the outer periphery thereof may be employed. In this case, it is possible to prevent the distortion of the measurement result of the refractive index distribution of the preform by the striae pitches to some extent. Accordingly, it is possible to accurately measure the refractive index distribution of the glass preform having the striae. In FIG. 9, b1 indicates a change in the gravity center position of the measuring laser beam when the striae pitch P is 5.0 μm, b2 indicates a change in the gravity center position of the measuring laser beam when the striae pitch P is 6.0 μm, and b3 indicates a change in the gravity center position of the measuring laser beam when the striae pitch P is 7.0 μm. By sequentially combining b1 to b3, appropriate striae pitches can be obtained. The invention is not limited to the type of optical fiber such as a single mode optical fiber or a multi-mode optical fiber and can be applied to any preform for an optical fiber to which a refractive index adjusting additive is added and has striae due to difference in the concentration of the additive. The invention can be applied to a step index type or a graded index type with respect to the shape of the refractive index distribution and may have another shape. In particular, a preform of a multi-mode optical fiber having a graded index type refractive index distribution has a large core diameter and a large concentration of a refractive index adjusting additive. Thus, the invention can be preferably applied to this since the influence of striae is likely to occur.

REFERENCE SIGNS LIST

1 glass preform, 2: center portion, 3: glass deposition layer, 11: burner, 12: starting material, 13: glass fine particle deposit, S1: rotation direction, T1, T2: growth axis direction (traverse direction).

The invention claimed is:

1. An optical fiber preform comprising:
   a glass material and a refractive index adjusting additive,
   wherein the preform has striae due to difference in concentration of the additive, the striae have concentric refractive index periodicity in at least a part thereof from a radial center of the preform to an outer periphery thereof, and respective striae pitches each indicating a period of the refractive index periodicity increase from the center of the preform to the outer periphery thereof.

2. The optical fiber preform according to claim 1, wherein the striae pitches each indicating the period of the refractive index periodicity increase from the center of the preform to the outer periphery thereof in the range of 2 μm or more and 10 μm or less.

3. The optical fiber preform according to claim 1, wherein the striae pitches have at least three or more different thicknesses.

4. The optical fiber preform according to claim 3, wherein the striae pitches have three different thicknesses of 5.5 μm, 6.0 μm, and 6.5 μm.

5. The optical fiber preform according to claim 3, wherein the striae pitches have three different thicknesses of 5 μm, 6 μm, and 7 μm.

6. The optical fiber preform according to claim 1, wherein the striae pitches have at least five different thicknesses.

7. The optical fiber preform according to claim 6, wherein the striae pitches have nine different thicknesses of 4.0 μm, 4.5 μm, 5.0 μm, 5.5 μm, 6.0 μm, 6.5 μm, 7.0 μm, 7.5 μm, and 8.0 μm.

8. The optical fiber preform according to claim 1, wherein the striae pitches increase from the center of the preform to the outer periphery thereof by the unit of 0.3 μm or more.

9. The optical fiber preform according to claim 8, wherein the striae pitches increase from the center of the preform to the outer periphery thereof by the unit of 0.5 μm.

10. The optical fiber preform according to claim 1, wherein each of the striae pitches is set to increase from the center of the preform to the outer periphery thereof so that a curve approximating a relationship between a radius facing from the center of the preform to the outer periphery thereof and each striae pitch increasing from the center of the preform to the outer periphery thereof protrudes upward.

\* \* \* \* \*